US012480871B2

(12) United States Patent
Balthasar et al.

(10) Patent No.: US 12,480,871 B2
(45) Date of Patent: Nov. 25, 2025

(54) APPARATUS FOR DETECTING MATTER

(71) Applicant: Tomra Sorting GmbH, Mülheim-Kärlich (DE)

(72) Inventors: Dirk Balthasar, Boppard (DE); Michael Mayer, Neuwied-Oberbieber (DE); Patrick Sturm, Koblenz (DE); Tobias Tückmantel, Wuppertal (DE)

(73) Assignee: Tomra Sorting GmbH, Mülheim-Kärlich (DE)

( * ) Notice: Subject to any disclaimer, the term of this patent is extended or adjusted under 35 U.S.C. 154(b) by 128 days.

(21) Appl. No.: 18/000,549

(22) PCT Filed: May 4, 2021

(86) PCT No.: PCT/EP2021/061647
§ 371 (c)(1),
(2) Date: Dec. 2, 2022

(87) PCT Pub. No.: WO2021/249698
PCT Pub. Date: Dec. 16, 2021

(65) Prior Publication Data
US 2023/0213443 A1  Jul. 6, 2023

(30) Foreign Application Priority Data
Jun. 8, 2020 (EP) .................. 20178662

(51) Int. Cl.
*G01N 21/39* (2006.01)
*G01J 3/28* (2006.01)
(Continued)

(52) U.S. Cl.
CPC ............ *G01N 21/39* (2013.01); *G01J 3/2823* (2013.01); *G01J 2003/2826* (2013.01);
(Continued)

(58) Field of Classification Search
CPC ............ G01N 21/39; G01N 2021/845; G01N 2021/8592; G01N 2201/06113;
(Continued)

(56) References Cited

U.S. PATENT DOCUMENTS

2004/0027574 A1* 2/2004 Bruner ................ B07C 5/342
356/417
2006/0176475 A1* 8/2006 Ruymen ............... G01N 21/85
356/237.1
(Continued)

FOREIGN PATENT DOCUMENTS

CN 108507944 A 9/2018
DE 19650705 A1 6/1998
(Continued)

OTHER PUBLICATIONS

International Search Report (PCT/ISA/210) and Written Opinion (PCT/ISA/237) mailed on Jul. 28, 2021, by the European Patent Office as the International Searching Authority for International Application No. PCT/EP2021/061647.
(Continued)

*Primary Examiner* — Tarifur R Chowdhury
*Assistant Examiner* — Akbar H. Rizvi
(74) *Attorney, Agent, or Firm* — Buchanan Ingersoll & Rooney PC

(57) ABSTRACT

An apparatus for detecting matter including: a light source arrangement adapted to emit a first and a second set of light beams towards a first detection zone through which the matter is provided. A spectroscopy system adapted to receive and analyse light which is reflected and/or scattered by matter in the first detection zone. A laser triangulation system including, a laser arrangement adapted to emit a line of laser light towards a second detection zone. A camera-based sensor arrangement configured to receive and analyse light which is reflected and/or scattered by matter in the second detection zone. The received light of the spectros-
(Continued)

US 12,480,871 B2

Page 2 copy system completely or partially intersects the received light of the camera-based sensor arrangement and/or the line of laser light.

21 Claims, 5 Drawing Sheets

(51) Int. Cl.
  *G01N 21/84* (2006.01)
  *G01N 21/85* (2006.01)
(52) U.S. Cl.
  CPC .......... *G01N 2021/845* (2013.01); *G01N 2021/8592* (2013.01); *G01N 2201/06113* (2013.01)
(58) Field of Classification Search
  CPC ......... G01N 2201/104; G01N 21/3563; G01N 21/359; G01N 21/31; G01N 21/65; G01N 21/9501; G01N 21/6458; G01N 2201/068; G01N 2223/076; G01N 23/223; G01N 2021/653; G01N 21/94; G01N 21/1702; G01N 29/2418; G01N 29/2425; G01N 29/449; G01N 2021/1793; G01N 21/3504; G01N 21/45; G01N 21/8806; G01N 2021/655; G01N 21/171; G01N 21/21; G01N 21/636; G01N 21/6445; G01N 21/88; G01N 2201/0637; G01N 21/274; G01N 21/55; G01N 2021/399; G01N 21/1717; G01N 21/64; G01N 21/85; G01N 2021/3595; G01N 21/211; G01N 21/3103; G01N 21/4795; G01N 21/658; G01N 23/20; G01N 23/2252; G01N 27/44713; G01N 27/44791; G01N 33/004; G01N 15/0612; G01N 15/065; G01N 15/1434; G01N 15/1456; G01N 15/149; G01N 2015/1472; G01N 2015/1477; G01N 2021/015; G01N 2021/1727; G01N 2021/1738; G01N 2021/213; G01N 2021/218; G01N 2021/3129; G01N 2021/396; G01N 2021/458; G01N 2021/4735; G01N 2021/4766; G01N 2021/4783; G01N 2021/6417; G01N 2021/6471; G01N 2021/6491; G01N 2021/8578; G01N 21/01; G01N 21/251; G01N 21/3581; G01N 21/47; G01N 21/474; G01N 21/538; G01N 21/59; G01N 21/645; G01N 21/648; G01N 21/8851; G01N 21/93; G01N 21/956; G01N 2201/024; G01N 2201/0612; G01N 2201/062; G01N 2201/067; G01N 2201/0697; G01N 2201/08; G01N 2201/127; G01N 2223/304; G01N 2223/633; G01N 23/041; G01N 23/046; G01N 23/20075; G01N 23/201; G01N 2333/445; G01N 30/74; G01N 33/0037; G01N 33/0054; G01N 15/1459; G01N 2015/0038; G01N 2015/1006; G01N 2015/144; G01N 2015/145; G01N 2021/0106; G01N 2021/0378; G01N 2021/1765; G01N 2021/3125; G01N 2021/3181; G01N 2021/3513; G01N 2021/394; G01N 2021/395; G01N 2021/4709; G01N 2021/6421; G01N 2021/6423; G01N 2030/623; G01N 2035/00326; G01N 21/0303; G01N 21/031; G01N 21/0332; G01N 21/05; G01N 21/11; G01N 21/23; G01N 21/253; G01N 21/27; G01N 21/314; G01N 21/3151; G01N 21/33; G01N 21/3586; G01N 21/61; G01N 21/6402; G01N 21/6408; G01N 21/6428; G01N 21/6452; G01N 21/6456; G01N 21/718; G01N 21/7743; G01N 21/9515; G01N 21/95684; G01N 2201/061; G01N 2201/0696; G01N 2201/1056; G01N 23/203; G01N 23/2251; G01N 25/72; G01N 33/0067; G01N 33/02; G01N 33/22; G01J 3/2823; G01J 2003/2826; B07C 5/342; G02B 21/0056; G02B 21/0032; G02B 26/06; G02B 21/367; G02B 26/0808; G02B 27/58; G02B 27/144; G02B 27/145; G02B 21/0016; G02B 23/2423; G02B 26/0833; G02B 17/0896; G02B 21/0064; G02B 21/0072; G02B 21/0092; G02B 21/06; G02B 21/088; G02B 21/14; G02B 21/245; G02B 23/2407; G02B 23/2469; G02B 27/017; G02B 27/1006; G02B 27/108; G02B 27/126; G02B 27/143; G02B 27/4227; G02B 5/32; G02B 6/266; G02B 6/29311; G02B 6/29314; G02B 6/2938; G02B 6/29391; G02B 6/3512; G02B 6/3534; G02B 6/3548; G02B 6/3556; G02B 17/0808; G02B 21/082; G02B 26/0891; G02B 27/141; G02B 7/28; G02B 13/146; G02B 17/0812; G02B 17/0852; G02B 21/16; G02B 26/0825; G02B 26/101; G02B 26/108; G02B 27/106; G02B 27/1086; G02B 27/1093; G02B 27/14; G02B 27/283; G02B 27/46; G02B 5/23; G02B 5/3066; G02B 6/4206; G02B 6/4226; G01Q 60/22

See application file for complete search history.

(56) References Cited

U.S. PATENT DOCUMENTS

| | | | |
|---|---|---|---|
| 2011/0188038 A1* | 8/2011 | Gollier | G01N 21/7743 356/328 |
| 2011/0216190 A1* | 9/2011 | Shimazu | G01N 21/359 348/135 |
| 2013/0126399 A1* | 5/2013 | Wolff | B07C 5/342 209/555 |
| 2016/0252461 A1* | 9/2016 | Balthasar | G01N 21/85 356/445 |
| 2016/0263624 A1 | 9/2016 | Balthasar et al. | |
| 2018/0245915 A1 | 8/2018 | Zhokhavets et al. | |
| 2018/0270474 A1 | 9/2018 | Liu | |
| 2019/0377134 A1* | 12/2019 | Yi | G01N 21/474 |

FOREIGN PATENT DOCUMENTS

| | | | |
|---|---|---|---|
| JP | 2016540996 A | 12/2016 | |
| JP | 2018514748 A | 6/2018 | |
| WO | WO-0107950 A1 * | 2/2001 | B07C 5/342 |

OTHER PUBLICATIONS

Office Action (Communication under Rule 71(3) EPC issued on issued on May 16, 2024, by the European Patent Office in corresponding European Application No. 21 723 244.6-1001. (5 pages).

(56) References Cited

OTHER PUBLICATIONS

Office Action (Notice of Reasons for Refusal) issued on Apr. 4, 2025, by the Japanese Patent Office in corresponding Japanese Patent Application No. 2022-572265, and an English Translation of the Office Action. (8 pages).

Office Action issued on Aug. 1, 2025, by the Chinese Patent Office in corresponding Chinese Patent Application No. 202180039035, and an English Translation of the Office Action. (17 pages).

* cited by examiner

APPARATUS FOR DETECTING MATTER

FIELD OF THE INVENTION

The present invention relates to an apparatus for detecting matter and more specifically to such an apparatus comprising a spectroscopy system and a laser triangulation system.

BACKGROUND ART

Throughout a wide range of industries identification, detection, classification and sorting of various objects are frequently required and desired.

In its simplest form, manual identification of objects by a person may be employed to advantage when a limited number of objects are to be identified, sorted and classified. The person in question may then, based on his/her knowledge identify and classify the objects concerned. This type of manual identification is however monotonous and prone to errors. Also, the experience level of the operator will significantly influence the results of the operation performed by the operator. Moreover, manual identification of the above kind suffers from low identification speeds.

In industry, identification, sorting and classification of bulk objects is therefore often performed by machines where the bulk objects are supplied in form of a continuous object stream. Such machines are generally faster than an operator and can operate for longer periods of time, hence offering an enhanced overall throughput. Machines of this kind are for instance used in agriculture for fruits and vegetables, and in recycling for identifying and sorting objects and materials that are to be recycled.

Machines of the above kind generally have some form of sensor that is used for identifying the objects of interest. For instance, an optical sensor in form of a spectral sensor may be employed to determine the quality of harvested fruits and vegetables. Similarly, a spectral sensor may be employed to determine the material of objects that are to be recycled.

However, in order to determine more attributes of the objects, a plurality of sensors is typically required. The use of more than one sensor generally results in that the machines will have to be made larger in order to be able to fit the further sensors and associated entities required. Hence, the footprint of the machines increases. The increased footprint resulting in that valuable industry space that might be used for other purposes is needed for installing the machines. Also, the use of further sensors may result in that the sensors interfere with each other if not positioned sufficiently far away from each other.

DE 196 50 705 A1 discloses a method and an arrangement for implementation of more compact and inexpensive multisensory cameras in which different image sensors, being sensitive to different properties, are stacked vertically on top of each other in a common beam path. The individual stacked image sensors are aligned such that corresponding pixels of the respective image sensors views the same portion of the object being viewed.

WO 01/07950 A1 discloses a sorting device, provided with an inspection unit, where products to be sorted are inspected on their acceptability.

US 2016/0263624 A1 discloses an apparatus for detecting matter in which a plurality of objects is fed into a detection region. The objects are illuminated in the detection region and light having passed through the objects are detected.

US 2004/0027574 A1 discloses an apparatus and methods for sensing the presence of bright white paper on a conveyor of a paper sorting system by utilizing fluorescence triggered by ultraviolet light.

SUMMARY OF THE INVENTION

In view of that stated above, an object of the present invention is to provide an apparatus for detecting matter which is compact and hence requires less installation space.

Another object is to provide such an apparatus enabling efficient detection of matter by using a spectroscopy system and a laser triangulation system.

Another object is to provide such an apparatus enabling enhanced detection of matter.

To achieve at least one of the above objects, and also other objects that will be evident from the following description, an apparatus having the features defined in claim 1 is provided according to the present invention. Preferred variants of the apparatus will be evident from the dependent claims.

More specifically, there is provided according to the present invention an apparatus for detecting matter, the apparatus comprising: a light source arrangement adapted to emit a first set of light beams and a second set of light beams towards a first detection zone through which the matter is provided, a spectroscopy system including a spectrometer, wherein the spectroscopy system is adapted to receive and analyse light which is reflected and/or scattered by matter in the first detection zone, wherein the received light of the spectroscopy system originates from the first and second sets of light beams, and a laser triangulation system including, a laser arrangement adapted to emit a line of laser light towards a second detection zone through which the matter is provided, and a camera-based sensor arrangement configured to receive and analyse light which is reflected and/or scattered by matter in the second detection zone, wherein the received light of the camera-based sensor arrangement originates from the line of laser light, wherein the received light of the spectroscopy system completely or partially intersects the received light of the camera-based sensor arrangement and/or the line of laser light.

The apparatus comprises a light source arrangement which is adapted to emit a first set of light beams and a second set of light beams towards a first detection zone through which the matter is provided. Hence, the light source arrangement is adapted to emit two different separate sets of light beams. The first set of light beams and a second set of light beams emitted by the light source arrangement are both emitted towards a first detection zone.

It should be noted that within the context of this application, the term set of light beams may be any type of light, visible or non-visible such as NIR, IR or UV, having an extension other than an infinite decimal beam or ray. In other words, the set of light beams may mean any bundle or beam of light having a physical extension in space traverse to its propagation direction. The set of light beams may thus for instance form a beam of parallel light, a beam of non-parallel light, like a diverging or converging beam of light, or a band of light to give a few non-limiting examples.

The first set of light beams and a second set of light beams will hence reach the first detection zone through which matter is provided. The matter is provided through the first detection zone in the sense that the matter is transferred or conveyed through the first detection zone. The matter may be provided through the first detection zone in a continuous or intermittent manner. The matter may be provided through the first detection zone sequentially or in parallel. Hence, a single piece of matter or a plurality of pieces of matter may be in the first detection zone at the same time. Preferably a plurality of pieces of matter are present simultaneously in the first detection zone.

The apparatus comprises a spectroscopy system adapted to receive and analyse light which is reflected and/or scattered by matter in the first detection zone. The received light of the spectroscopy system is originating or predominantly originating from the first and second sets of light beams. Hence, a limited amount of ambient light may reach the spectroscopy system. The spectroscopy system is thus adapted such that it views the first detection zone in order to receive and analyse light which is reflected and/or scattered by matter in the first detection zone. Optical elements may be provided between an entry window of the spectroscopy system and the first detection zone to alter a beam path of the light being reflected and/or scattered by matter in the first detection zone.

The apparatus comprises a laser triangulation system. The laser triangulation system includes a laser arrangement adapted to emit a line of laser light towards a second detection zone through which the matter is provided. The laser arrangement typically includes one or more laser light sources and optionally optical elements for forming emitted laser light into a line of laser light.

It should be noted that within the context of this application, the term line of laser light may be any type of laser light, visible or non-visible, having an elongated extension, such that the light forms a line or a line-like profile when impinging on a surface.

The matter is provided through the second detection zone correspondingly to what has been described above in relation to the first detection zone. The matter may subsequently or parallelly be provided through the second detection zone.

The laser triangulation system includes a camera-based sensor arrangement configured to receive and analyse light which is reflected and/or scattered by matter in the second detection zone. The received light of the camera-based sensor arrangement is originating or predominantly originating from the line of laser light. Hence, a limited amount of ambient light may still reach the camera-based sensor arrangement. The camera-based sensor arrangement is thus adapted such that it views the second detection zone in order to receive and analyse light which is reflected and/or scattered by matter in the second detection zone. Like in any laser triangulation system, the reflected light of the line of laser light will move on the sensor element of the camera-based sensor arrangement in response to a height variation of the matter in the second detection zone. The sensor element of the camera-based sensor arrangement is typically an imaging sensor element including an array of light sensitive sensor pixels.

The received light of the spectroscopy system completely or partially intersects the received light of the camera-based sensor arrangement and/or the line of laser light. The particular provision of the spectroscopy system in relation to the camera-based sensor arrangement and/or the laser arrangement allows for a compact system requiring significantly less space.

In practice, the received light of the spectroscopy system, i.e. the light originating from the first and second set of light beams and having been reflected and/or scattered by matter in the first detection zone, will completely or partially intersect or cross the received light of the camera-based sensor arrangement, i.e. the light originating from the line of laser light and having been reflected and/or scattered by matter in the second detection zone.

Alternatively, the received light of the spectroscopy system, will completely or partially intersect or cross the line of laser light. Hence, both the spectroscopy system (and the light source arrangement) and the laser triangulation system may be provided in the same area of the apparatus meaning that both these systems may be provided in a space normally required for a single system. This means that a compact apparatus with enhanced detection capabilities is provided by the present invention.

Moreover, the matter may typically subsequently or parallelly to being provided through the first detection zone be provided through the second detection zone. This allows for that specific matter provided in the first detection zone may subsequently or parallelly be correlated to be the same matter when provided in through the second detection zone. This means in practice, that the same matter typically will be analysed by both the spectroscopy system and the laser triangulation system, either in sequence or parallelly. Hence, a compact apparatus with enhanced detection capabilities is provided by the present invention.

The apparatus may further comprise a focusing arrangement, wherein the focusing arrangement is adapted to direct and focus the first set of light beams and the second set of light beams on a scanning element, wherein the scanning element is adapted to redirect the first and second sets of light beams towards the first detection zone, whereby the first and second set of light beams converge at the first detection zone. This arrangement provides the advantage that the first detection zone may be illuminated by different sets of light beams entering the first detection zone at different angles. Matter provided through the first detection zone may thus be efficiently illuminated by the first set of light beams and the second set of light beams converging at the first detection zone.

The scanning element may scan the first and second set of light beams at the first detection zone.

The scanning element may be one of a rotating polygon mirror and a tilting mirror.

The light source arrangement may include a first light source adapted to emit the first set of light beams and a second light source adapted to emit the second set of light beams. By this arrangement, a more intense illumination may be provided at the first detection zone. Further, the illumination of the first detection zone may easily be tailored by using different types of light sources having different characteristics as the first and second light sources. Furthermore, a more robust apparatus may be achieved. The apparatus may not need to be taken out of operation if one of the first and second light sources fails and may consequently still be operated during exchange of one of the light sources.

The focusing arrangement may include a first focusing element adapted to direct and focus the first set of light beams on the scanning element and a second focusing element adapted to direct and focus the second set of light beams on the scanning element, which is advantageous in that the first and second sets of light beams may be directed and focused individually on the scanning element. The focusing elements may be any optical element capable of focusing and directing the first and/or second sets of light beams. The focusing elements may be a combination of a plurality of optical elements acting jointly. The focusing elements may direct the first and/or second sets of light beams along a direction of incoming light of the first and/or second sets of light beams. The first focusing element may be a lens or a mirror. The first focusing element may be a combination of a lens and a mirror. The second focusing element may be a lens or a mirror. The second focusing element may be a combination of a lens and a mirror.

The light source arrangement may include a single light source adapted to emit the first set of light beams and the second set of light beams, which is advantageous in that the light source arrangement may be made more energy efficient. Further, the light source arrangement may be made more compact since space may only have to be allocated to a single light source.

The focusing arrangement may include a first focusing element adapted to direct and focus the first set of light beams on the scanning element and a second focusing element adapted to direct and focus the second set of light beams on the scanning element, which is advantageous in that the first and second sets of light beams may be directed and focused individually on the scanning element. The focusing elements may be any optical element capable of focusing and directing the first and/or second sets of light beams. The focusing elements may be a combination of a plurality of optical elements acting jointly. The focusing elements may direct the first and/or second sets of light beams along a direction of incoming light of the first and/or second sets of light beams. The first focusing element may be a lens or a mirror. The first focusing element may be a parabolic mirror. The first focusing element may be an elliptical mirror or a mirror with a shape optimized to focus light into the first detection zone. The first focusing element may be an off-axis parabolic mirror. The first focusing element may be a combination of a lens and a mirror. The first focusing element may be a combination of a lens and a flat mirror. The second focusing element may be a lens or a mirror. The second focusing element may be a parabolic mirror. The second focusing element may be an elliptical mirror or a mirror with a shape optimized to focus light into the first detection zone. The second focusing element may be an off-axis parabolic mirror. The second focusing element may be a combination of a lens and a mirror. The second focusing element may be a combination of a lens and a flat mirror.

The spectroscopy system may include a first spectrometer system adapted to analyse light of a first wavelength interval and a second spectrometer system adapted to analyse light of a second wavelength interval, which is advantageous in that spectrometer systems adapted for analysis of a certain wavelength interval may be used. By this arrangement, more sensitive and accurate analysis may be performed. The first wavelength interval and the second wavelength interval may overlap or partially overlap. The first wavelength interval and the second wavelength interval may be separate intervals.

The spectroscopy system may include a first spectrometer system adapted to analyse light of a first wavelength interval, a second spectrometer system adapted to analyse light of a second wavelength interval and a third spectrometer system adapted to analyse light of a third wavelength interval.

The spectroscopy system may include a plurality of spectrometer systems adapted to analyse light of a plurality of wavelength intervals.

The spectroscopy system may be a scanning spectroscopy system, which is advantageous in that accurate analysis ranging over a wavelength interval may be performed on the matter in the first detection zone. Also, an image of the matter in the first detection zone may be acquired, where the image including information form the analysis of the light received by the scanning spectroscopy system.

The first detection zone and the second detection zone may overlap, which is advantageous in that it may become easier to correlate matter in the first detection zone to corresponding matter in the second detection zone. In other words, it may become easier to determine when a particular piece of matter having passed through the first detection zone passes through the second detection zone. This setup is advantageous when the matter is traveling through the first detection zone and/or second detection zone in a random fashion, as is generally the case when the matter is free falling or sliding through the first detection zone and/or second detection zone.

The first detection zone and the second detection zone may overlap partially. The first detection zone and the second detection zone may overlap completely. Hence, the first detection zone and the second detection zone may be located at the same physical location.

The apparatus may further include a first optical filter arranged between the light source arrangement and the first detection zone, the first optical filter counteracting light originating from the first set of light beams and the second set of light beams from reaching the camera-based sensor arrangement. This arrangement of the first optical filter may counteract undesired light that otherwise would risk disturbing the camera-based sensor system form reaching the same. The provision of the first optical filter is particularly relevant and hence advantageous when the first detection zone and the second detection zone overlap.

The apparatus may further include a second optical filter arranged between the second detection zone and the camera-based sensor arrangement, the second optical filter counteracts passing of light originating from the first set of light beams, the second set of light beams and ambient light while allowing passage of light originating from the line of laser light. This arrangement of the second optical filter may counteract undesired light that otherwise would risk disturbing the camera-based sensor arrangement form reaching the same. The provision of the second optical filter is particularly relevant and hence advantageous when the first detection zone and the second detection zone overlap.

The laser arrangement may further be adapted to emit a further line of laser light towards a second detection zone, and the camera-based sensor arrangement may be further configured to receive and analyse light originating from the further line of laser light which is reflected and/or scattered by matter in the second detection zone.

A wavelength of light of the further line of laser light may be different form a wavelength of light of the line of laser light.

The apparatus may further include a third optical filter arranged between the second detection zone and the camera-based sensor system, the second optical filter counteracts passing of light originating from the first set of light beams, the second set of light beams, the laser light and ambient light while allowing passage of light originating from the further line of laser light.

By the provision of a further line of laser light having a different wavelength than a wavelength of the line of laser light in combination with the third optical filter, the camera-based sensor system may be configured to receive and analyse light which is reflected and/or scattered by matter in the second detection zone based on different wavelengths. The received light originating from the line of laser light and from the further line of laser light may advantageously be directed to different areas of an imaging sensor element of the camera-based sensor system or to different imaging sensor elements of the camera-based sensor system. The possibility to analyse light which is reflected and/or scattered by matter in the second detection zone based on different wavelengths brings about that more information about the matter in the second detection zone may be acquired.

The apparatus may further comprise a processing unit coupled to the spectroscopy system and the camera-based sensor arrangement, wherein the processing unit is configured to determine a first property set pertaining to matter in the first detection zone based on an outputted signal of the spectroscopy system, and wherein the processing unit is configured to determine a second property set pertaining to matter in the second detection zone based on an outputted signal of the camera-based sensor arrangement.

The provision of a processing unit coupled to the spectroscopy system and the camera-based sensor arrangement brings about that the processing unit may determine properties or a property of matter in the respective first and second detection zones. The processing unit may thus receive signals form the spectroscopy system and the camera-based sensor arrangement respectively. The received signals may be based on analysis of the light received by the spectroscopy system and the camera-based sensor arrangement respectively.

It should be noted that within the context of this application, the term processing unit may be any unit, system or device capable of receiving a signal or signals or data from other entities and to process the received signals or data. The processing may for instance include calculating properties or a property based on the received signals or data, forwarding of the received signals or data and altering the received signals or data. The processing unit may be a single unit or may be distributed over a plurality of devices, such as a plurality of PCs, each having processing capabilities. The processing unit may be implemented in hardware or in software.

It should be noted that within the context of this application, the term property set may be any set of data including any type of data. The property set may include any number of properties including 0. Hence, the property set may be an empty set, which for instance may be indicative of a non-presence of matter.

The first property set may be indicative of at least one of a spectral response of the matter, a material type of the matter, a colour of the matter, a fluorescence of the matter, a ripeness of the matter, a dry matter content of the matter, a water content of the matter, a fat content of the matter, an oil content of the matter, a calorific value of the matter, a presence of bones or fishbones of the matter, a presence of pest, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a quality grade of the matter, a physical structure of the surface of the matter and a molecular structure of the matter.

An example of a relevant hazardous biological material that may be detected is mycotoxin.

The above features of the first property set may be determined in specific combinations which may be useful for detecting matter in the first detection zone. Examples of applications where such combinations are useful are sorting of pet food, detection of fishbones in fillets, paper sorting using visible and NIR spectroscopy, removal of foreign material and shells from pistachios, and recycling of polymers to give a few non-limiting examples.

The second property set may be indicative of at least one of a height of the matter, a height profile of the matter, a 3D map of the matter, an intensity profile of reflected and/or scattered light, a volume centre of the matter, an estimated mass centre of the matter, an estimated weight of the matter, an estimated material of the matter a presence of matter, a non-presence of matter, a detection of isotropic and anisotropic light scattering of the matter, a structure and quality of wood, a surface roughness and texture of the matter and an indication of presence of fluids in the matter.

Examples of relevant fluids are oil and water in food products. The above features of the second property set may be determined in specific combinations which may be useful for detecting matter in the second detection zone. Examples of applications where such combinations are useful are glass sorting and quartz sorting to give a few non-limiting examples.

The processing unit may be further configured to receive an input indicative of a viewing angle of the camera-based sensor arrangement with respect to the second detection zone, and to compensate for the viewing angle of the camera-based sensor arrangement when determining the second property set, which is advantageous in that a more accurate subsequent sorting or ejection of the matter may be achieved. In practice the height of the matter in the second detection zone may be compensated for when determining a position of the matter in the second detection zone. By this, a subsequent sorting or ejection operation may affect or influence the matter in a location counteracting wrongful sorting or ejection. For instance, a sorter or ejector may impinge on matter at its estimated mass center thereby reducing the risk of for instance slipping or tumbling of the matter. An ejector may be configured with valve image processing steps for reducing or minimizing the compressed air consumption and energy consumption while keeping optimal sorting yield and sorting loss.

The processing unit may be configured to receive an input indicative of a geometry of the laser arrangement and the camera-based sensor arrangement with respect to the second detection zone.

The processing unit may be configured to compensate for the geometry of the laser arrangement and the camera-based sensor arrangement with respect to the second detection zone when determining the second property set.

The apparatus may further comprise an ejection arrangement coupled to the processing unit, wherein the ejection arrangement is adapted to eject and sort matter into a plurality of fractions in response to receiving a signal from the processing unit based on the determined first property set and/or the determined second property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

By the provision of an ejection arrangement coupled to the processing unit, the apparatus may eject and thus sort the matter into a plurality of fractions based on the determined first property set and/or the determined second property set. Hence, the matter may be sorted based on analysis performed by the spectroscopy system and/or the laser triangulation system.

The plurality of fractions may be based on any of the determined properties. The fractions may for instance be based on material or colour. One fraction may correspond to matter that is to be discarded or scrapped.

The ejection and sorting may be executed by a jet of compressed air, a jet of pressurized water, a mechanical finger, a bar of jets of compressed air, a bar of jets of pressurized water, a bar of mechanical fingers, a robotic arm or a mechanical diverter.

Alternatively, to being ejected and sorted the matter may be analyzed online by for instance a cloud service. The so analyzed matter may then be classified for instance in terms of purity, defect level, average color etc.

The apparatus may further comprise, a conveyor for conveying matter through the first detection zone and the second detection zone, or a chute, optionally including a vibration feeder, for sliding or freefalling of the matter through the first detection zone and/or the second detection zone.

By the provision of a conveyor, the matter may be conveyed through the first detection zone and second detection zone in a controlled manner. Matter conveyed through and analysed in the first detection zone may then be conveyed through and analysed in the second detection zone. By a controlled conveyance of matter through the first detection zone and the second detection zone matter may be kept track of. Hence, matter in the first detection zone may be correlated or identified as being the same matter in the second detection zone.

By the provision of a chute, optionally including a vibration feeder, the matter may be slid or made freefalling through the first detection zone and/or the second detection zone. The matter may be slid though the first detection zone and the second detection zone. The matter may be made to freefall through the first detection zone and the second detection zone. The matter may be slid though the first detection zone and made to freefall through the second detection zone. The provision of a chute, optionally including a vibration feeder, is advantageous for small bulk object such as grains of different kinds.

A further scope of applicability of the present invention will become apparent from the detailed description given below. However, it should be understood that the detailed description and specific examples, while indicating preferred variants of the present inventive concept, are given by way of illustration only, since various changes and modifications within the scope of the inventive concept will become apparent to those skilled in the art from this detailed description.

Hence, it is to be understood that this inventive concept is not limited to the particular component parts of the device described as such device may vary. It is also to be understood that the terminology used herein is for purpose of describing particular variants only, and is not intended to be limiting. It must be noted that, as used in the specification and the appended claim, the articles "a," "an," "the," and "said" are intended to mean that there are one or more of the elements unless the context clearly dictates otherwise. Thus, for example, reference to "a unit" or "the unit" may include several devices, and the like. Furthermore, the words "comprising", "including", "containing" and similar wordings does not exclude other elements.

BRIEF DESCRIPTION OF THE DRAWINGS

The aspects of the present inventive concept, including its particular features and advantages, will be readily understood from the following detailed description and the accompanying drawings. The figures are provided to illustrate the general structures of the present inventive concept. Like reference numerals refer to like elements throughout.

DETAILED DESCRIPTION

The present inventive concept will now be described more fully hereinafter with reference to the accompanying drawings, in which currently preferred variants of the inventive concept are shown. This inventive concept may, however, be implemented in many different forms and should not be construed as limited to the variants set forth herein; rather, these variants are provided for thoroughness and completeness, and fully convey the scope of the present inventive concept to the skilled person.

Figure 1:
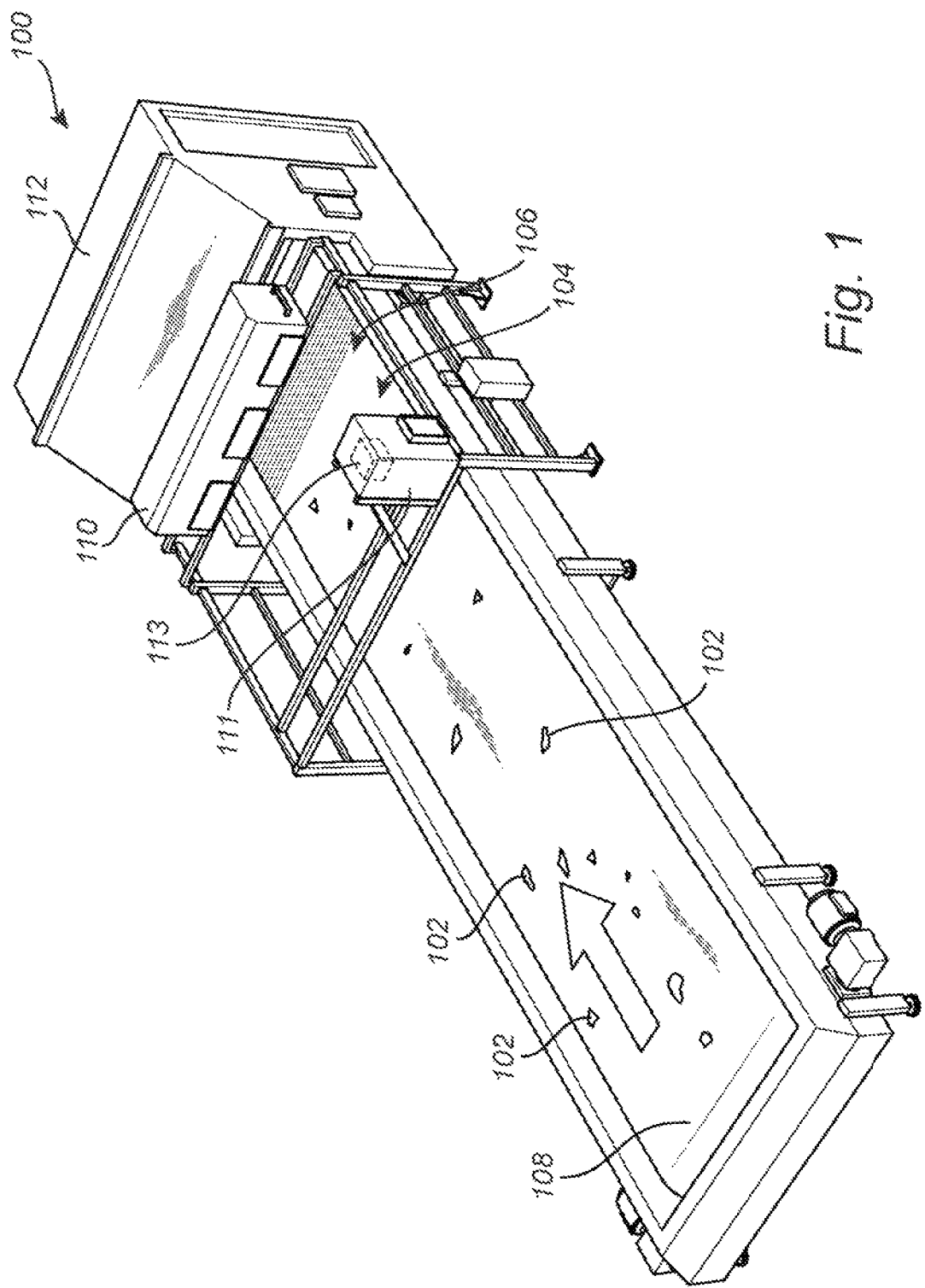
FIG. 1 is a perspective schematic view of an apparatus for detecting matter.

FIG. 1 schematically illustrates an apparatus 100 for detecting matter. Matter 102 is provided through a first detection zone 104 and a second detection zone 106.

In the depicted apparatus 100 of FIG. 1, the matter 102 is provided through the first detection zone 104 and the second detection zone 106 by means of a conveyor 108. However, the matter 102 may be provided through the first detection zone 104 and the second detection zone 106 by any suitable means or manually without any technical means. Further, the matter 102 may be provided through the first detection zone 104 and the second detection zone 106 by sliding or freefalling. Hence, the conveyor of FIG. 1 is optional.

The depicted apparatus 100 of FIG. 1 further includes a housing 110 arranged above the first detection zone 104 and the second detection zone 106. In other words, the housing 110 is arranged above the conveyor 108.

Figure 2:
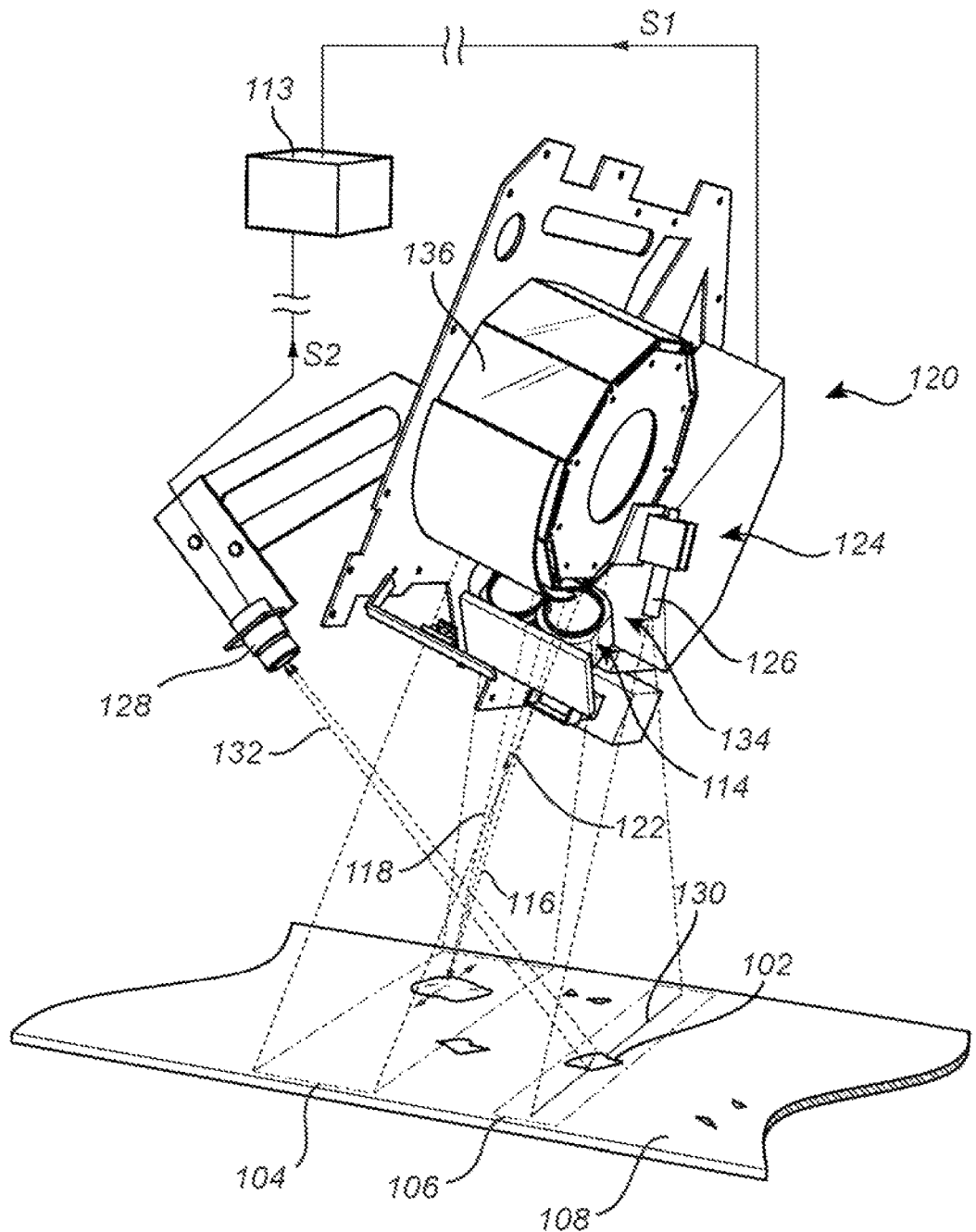
FIG. 2 is a schematic perspective detail view of the apparatus of FIG. 1.

Now also referring to FIG. 2 which schematically discloses a selection of components arranged in the housing 110.

In the interior of the housing 110 there is provided a light source arrangement 114 adapted to emit a first set of light beams 116 and a second set of light beams 118 towards the first detection zone 104.

In the interior of the housing 110 there is provided a spectroscopy system 120 adapted to receive and analyse light 122 which is reflected and/or scattered by matter 102 in the first detection zone 104.

In the interior of the housing 110 there is provided a laser triangulation system 124. The laser triangulation system 124 includes a laser arrangement 126 adapted to emit a line of laser light 130 towards the second detection zone 106. The laser triangulation system 124 includes a camera-based sensor arrangement 128 configured to receive and analyse light 132 which is reflected and/or scattered by matter 102 in the second detection zone 106.

The depicted apparatus 100 of FIG. 1 further includes an ejection arrangement 112 provided downstream of the first detection zone 104 and the second detection zone 106. The ejection arrangement 112 is adapted to eject and sort the matter 102 into a plurality of fractions. However, the ejection arrangement 112 of FIG. 1 is optional.

The depicted apparatus 100 of FIG. 1 further includes a control cabinet 111 arranged above the conveyor 108. The control cabinet 111 includes equipment used for controlling the apparatus 100. The equipment typically includes a processing unit 113 or control unit for controlling the conveyor 108, the ejection arrangement 112 and the equipment in the housing 110. The processing unit 113 is typically used to determine properties or a property of the matter 102 based on measurement carried out by the equipment in the housing 110.

Now referring to FIG. 2 in particular, here is conceptually depicted components in the interior of the housing 110 of FIG. 1. FIG. 2 also illustrates a portion of the conveyor 108 including the first detection zone 104 and the second detection zone 106.

As can be seen in FIG. 2, the received light 122 of the spectroscopy system 120 intersects the received light 132 of the camera-based sensor arrangement 128.

Matter 102 is provided through the first detection zone 104 and the second detection zone 106 by means of the conveyor 108. In other words, the matter 102 is in the depicted apparatus 100 of FIGS. 1 and 2 conveyed through the first detection zone 104 and the second detection zone 106. The matter 102 is typically conveyed through the first detection zone 104 and the second detection zone 106 continuously. The matter 102 may be conveyed through the first detection zone 104 and the second detection zone 106 in an intermittent manner. The matter 102 may be conveyed through the first detection zone 104 first and subsequently through the second detection zone 106. The matter 102 may be conveyed through the second detection zone 106 first and subsequently through first detection zone 104.

The laser arrangement 126 includes a line laser which emits the line of laser light 130. The laser may be of any suitable kind. The laser preferably has a peak wavelength at 660 nm or 640 nm. An example of a suitable laser is Z100M18S3-F-660-LP60-PR manufactured by Z-Laser which emits a line of laser light having a wavelength of 660 nm. The laser arrangement 126 may be equipped with a thermoelectric cooling device and insulation to withstand a typical ambient temperature of 60° C. The line of laser light 130 impinges on the matter 102 in the second detection zone 106, where the light is reflected and/or scattered by the matter 102. A portion of the so reflected and/or scattered light 132 typically reaches the camera-based sensor arrangement 128, as schematically illustrated in FIG. 2. Hence, the camera-based sensor arrangement 128 will view and consequently image the line of laser light 130 as it impinges on the matter 102 in the second detection zone 106. The camera-based sensor arrangement 128 may for instance include a camera of the type C5 manufactured by AT—Automation Technology GmbH. Hence, as in any laser triangulation system 124 a height variation or a presence of the matter 102 in the second detection zone 106 will shift the location of the image of the line of laser light on a sensor element of the camera of the camera-based sensor arrangement 128. The shift owing from the angle difference between the field of view of the of the camera of the camera-based sensor arrangement 128 and the line of laser light 130. Various properties of the matter 102 in the second detection zone 106 may be determined based on measurements carried out by the camera-based sensor arrangement 128.

Further, in conjunction with the depicted light source arrangement 114 there is provided a focusing arrangement 134. The focusing arrangement 134 is adapted to direct and focus the first set of light beams 116 and the second set of light beams 118 on a scanning element 136. The scanning element 136 is adapted to redirect the first and second sets of light beams 116, 118 towards the first detection zone 104. By the arrangement of the scanning element 136 the first and second set of light beams 116, 118 converge at the first detection zone 104 as illustrated in FIG. 2. The depicted scanning element 136 of FIG. 2 is in the form of a rotational polygon mirror. Thus, by rotating the polygon mirror scanning of the first set of light beams 116 and the second set of light beams 118 in the first detection zone 104 will occur. The first set of light beams 116 and the second set of light beams 118 will hence be scanned across the first detection zone 104 and consequently be scanned across the conveyor 108.

Other types of scanning elements may be used to advantage. For example, a scanning mirror hinged about a pivot axis may be used.

As described above, the spectroscopy system 120 is adapted to receive and analyse light 122 which is reflected and/or scattered by matter 102 in the first detection zone 104. The light 122 which is reflected and/or scattered by matter 102 in the first detection zone 104 will before entering the spectroscopy system 120 impinge on the scanning element 136, i.e. the polygon mirror, form where the light 122 is directed to an entry window of the spectroscopy system 120 by means of a fixed folding mirror. The fixed folding mirror may be located between where the first set of light beams 116 and the second set of light beams 118 exits the focusing arrangement 134.

The spectroscopy system 120 may include a spectrometer manufactured by Tomra which is able to cope with the required repetition rate. The spectrometer may be configured to analyse light in the wavelength interval 400-1000 nm. The spectrometer may be configured to analyse light in the wavelength interval 500-1000 nm. The spectrometer may be configured to analyse light in the wavelength interval 1000-1900 nm. The spectrometer may be configured to analyse light having a wavelength above 900 nm. The spectrometer may be configured to analyse light in the wavelength interval 1900-2500 nm. The spectrometer may be configured to analyse light in the wavelength interval 2700-5300 nm. The spectrometer may be configured to analyse light in the wavelength interval 900-1700 nm. The spectrometer may be configured to analyse light in the wavelength interval 700-1400 nm. The spectrometer may analyse visible light. The spectrometer may analyse NIR light. The spectrometer may analyse IR light. Different types of spectrometers may be used depending on characteristics of the matter 102 to be detected.

More than one spectroscopy system 120 may be used in the apparatus 100. Hence, more than one spectrometer may be used in the apparatus 100. For instance, the spectroscopy system 120 may include a first spectrometer system 120 adapted to analyse light of a first wavelength interval and a second spectrometer system 120 adapted to analyse light of a second wavelength interval. As an example, a first spectroscopy system 120 may analyse light in the wavelength interval 450-800 nm and a second spectroscopy system 120 may analyse light in the wavelength interval 1500-1900 nm. For instance, one spectrometer for visible light may be used in combination with one NIR spectrometer.

Similarly, three or more spectroscopy systems 120 may be included in the spectroscopy system 120. Hence, three or more spectrometers may be used. For instance, one spectrometer for visible light may be used in combination with two NIR spectrometers.

The spectroscopy system 120 may be a scanning spectroscopy system 120. An example of a suitable scanning spectrometer is manufactured by Tomra.

Various properties of the matter 102 in the first detection zone 104 may be determined based on measurements carried out by the spectroscopy system 120.

As discussed above, the depicted apparatus 100 of FIGS. 1 and 2 includes a processing unit 113. The processing unit 113 is in the depicted apparatus 100 located in the control cabinet 111. The processing unit 113 is coupled to the spectroscopy system 120 and the camera-based sensor arrangement 128. The coupling between the processing unit 113, the spectroscopy system 120 and the camera-based sensor arrangement 128 is schematically illustrated by broken lines in FIG. 2. The processing unit 113 may be coupled to the spectroscopy system 120 and the camera-based sensor arrangement 128 by any suitable connection, including wired and wireless connections. Any connection capable of transmitting data in any format, digital or analogue, may be used to advantage.

The processing unit 113 of the depicted apparatus 100 is configured to determine a first property set pertaining to matter 102 in the first detection zone 106. As discussed above, the first property set may be any set of data including any type of data. The first property set may include any number of properties. The first property set is determined based on an outputted signal S1 of the spectroscopy system 120. The signal S1 may include any kind of data, processed or raw data. The processing unit 113 is thus configured to receive and analyse data based on the outputted signal S1 of the spectroscopy system 120 and to determine a first property set based on the signal S1.

The first property set may be indicative of at least one of a spectral response of the matter 102, a material type of the matter 102, a colour of the matter 102, a fluorescence of the matter 102, a ripeness of the matter 102, a dry matter content of matter 102, a water content of the matter 102, a fat content of the matter 102, an oil content of the matter 102, a calorific value of the matter 102, a presence of bones or fishbones of the matter 102, a presence of pest of the matter 102, a mineral type of the matter 102, an ore type of the matter 102, a defect level of the matter 102, a detection of hazardous biological materials of the matter 102, a presence of matter 102, a non-presence of matter 102, a detection of multilayer materials of the matter 102, a detection of fluorescent markers of the matter 102, a quality grade of the matter 102, a physical structure of the surface of the matter 102 and molecular structure of the matter 102.

Also, the spectroscopy system 120 may include processing capabilities possibly used to process the actual raw data from the spectrometer or spectrometers of the spectroscopy system 120. This means that the spectroscopy system 120 may be capable of determining properties or a property to be included in the first property set by the processing unit 113. In other words, the processing unit 113 may be configured to simply include already processed data form the spectroscopy system 120 into the first property set.

For different applications of the apparatus 100 different properties are typically included in the first property set. In other words, the first property set is typically indicative of different properties for different applications of the apparatus 100.

In applications where waste is recycled, the first property set is typically indicative of polymer material, sleeve material and cap material.

In applications where fruit or vegetables are sorted, the first property set is typically indicative of foreign matter like polymers, stones and shells.

In applications where wood is sorted, the first property set is typically indicative of wood type and presence of foreign material.

The processing unit 113 of the depicted apparatus 100 is configured to determine a second property set pertaining to matter 102 in the second detection zone 108. As discussed above, the second property set may be any set of data including any type of data. The second property set may include any number of properties. The second property set is determined based on an outputted signal S2 of the camera-based sensor arrangement 128. The signal S2 may include any kind of data, processed or raw data. The processing unit 113 is thus configured to receive and analyse data based on the outputted signal S2 of the of the camera-based sensor arrangement 128 and to determine a second property set based on the signal S2.

The second property set may be indicative of at least one of a height of the matter 102, a height profile of the matter 102, a 3D map of the matter 102, an intensity profile of reflected and/or scattered light 132, a volume centre of the matter 102, an estimated mass centre of the matter 102, an estimated weight of the matter 102, an estimated material of the matter 102, a presence of matter 102, a non-presence of matter 102, a detection of isotropic and anisotropic light scattering of the matter 102, a structure and quality of wood, a surface roughness and texture of the matter 102 and an indication of presence of fluids in the matter 102.

Also, the camera-based sensor arrangement 128 may include processing capabilities possibly used to process the actual raw data from the camera or cameras of the camera-based sensor arrangement 128. This means that the camera-based sensor arrangement 128 may be capable of determining properties or a property to be included in the second property set by the processing unit 113. In other words, the processing unit 113 may be configured to simply include already processed data form the camera-based sensor arrangement 128 into the second property set.

For different applications of the apparatus 100 different properties are typically included in the second property set, as has been described in conjunction with the first property set above. In other words, the second property set is typically indicative of different properties for different applications of the apparatus 100.

The processing unit 113 of the depicted apparatus 100 may be configured to compensate for the viewing angle of the camera-based sensor arrangement 128 with respect to the second detection zone 106 and hence with respect to the conveyor 108. In order to be able to compensate for the viewing angle of the camera-based sensor arrangement 128 with respect to the second detection zone 106, the processing unit 113 is configured to receive an input indicative of the viewing angle of the camera-based sensor arrangement 128 with respect to the second detection zone 106, i.e., with respect to the second detection zone 106 on the conveyor 108. Based on the received input related to the viewing angle, the processing unit 113 may thus compensate for the viewing angle of the camera-based sensor arrangement 128 with respect to the second detection zone 106 when determining the second property set based on the received signal S2.

The received input pertaining to the viewing angle of the camera-based sensor arrangement 128 with respect to the second detection zone 106 may be a static variable indicative of the viewing angle. The received input pertaining to the viewing angle of the camera-based sensor arrangement 128 with respect to the second detection zone 106 may be a dynamic input based on a measurement of the viewing angle. In the latter case, dynamic variations in for instance the conveyor 108 may be accounted for.

In practice, the height or a varying height of the matter 102 may be taken into account and compensated for when determining a position of the matter in the second detection zone 106. Moreover, the geometry of the laser arrangement 126 and the camera-based sensor arrangement 128 may be taken into account when determining the position of the matter in the second detection zone 106.

If the height of the matter 102 is not compensated for when determining a position of the matter 102 in the second detection zone 106, a subsequent ejection and sorting of the matter 102 may risk becoming less accurate since the actual position of the matter 102 may differ from the determined position. Wrongful or no ejection and sorting may also occur. For instance, the ejection arrangement 112 may impinge on a less favorable position at an edge region of the matter 102 resulting in a wrongful ejection and sorting of the matter 102. In other words, the ejection arrangement 112 may impinge on the matter in a position far away from the mass center of the matter 102, which in turn may result in that the matter is tumbling rather than being displaced, i.e. ejected and sorted.

The processing unit 113 may be configured to receive an input indicative of a geometry of the laser arrangement 126 and the camera-based sensor arrangement 128 with respect to the second detection zone 106.

The processing unit 113 of the depicted apparatus 100 may be configured to compensate for the geometry of the laser arrangement 126 and the camera-based sensor arrangement 128 with respect to the second detection zone 106, and hence with respect to the conveyor 108, when determining the second property set.

The ejection arrangement 112 of the depicted apparatus 100 is coupled to the processing unit 113. The ejection arrangement 112 is adapted to eject and thus sort matter 102 into a plurality of fractions. For instance, the matter 102 may be sorted into one scrap fraction and one fraction that is to be used. In case of fruits and vegetables, the matter 102, i.e. the fruits and vegetables, may be sorted into a plurality of fractions based on a colour which in turn corresponds to a ripeness level, defects or presence of foreign material.

The ejection and sorting performed by the ejection arrangement 112 may be initiated in response to receiving a signal form the processing unit 113. The signal from the processing unit 113 is typically based on the determined first property set and/or the determined second property set. Hence, the matter may be sorted based on analysis performed by the spectroscopy system 120 and/or the laser triangulation system 124.

The so received signal may be a simple on/off signal or may be a complex signal including for instance specific coordinates of the matter 102 when approaching the ejection arrangement 112. In the latter case, the ejection arrangement 112 may thus impinge on or grip specific matter 102 fulfilling specific criteria and do so in a specific location, resulting in that the matter 102 is ejected and thus sorted.

To perform the actual ejection and sorting, the ejection arrangement 112 may include a jet of compressed air, a jet of pressurized water, a mechanical finger, a bar of jets of compressed air, a bar of jets of pressurized water, a bar of mechanical fingers, a robotic arm and a mechanical diverter. The entities and principles used to perform the ejection and sorting are consequently known in the art per se.

Figure 3:
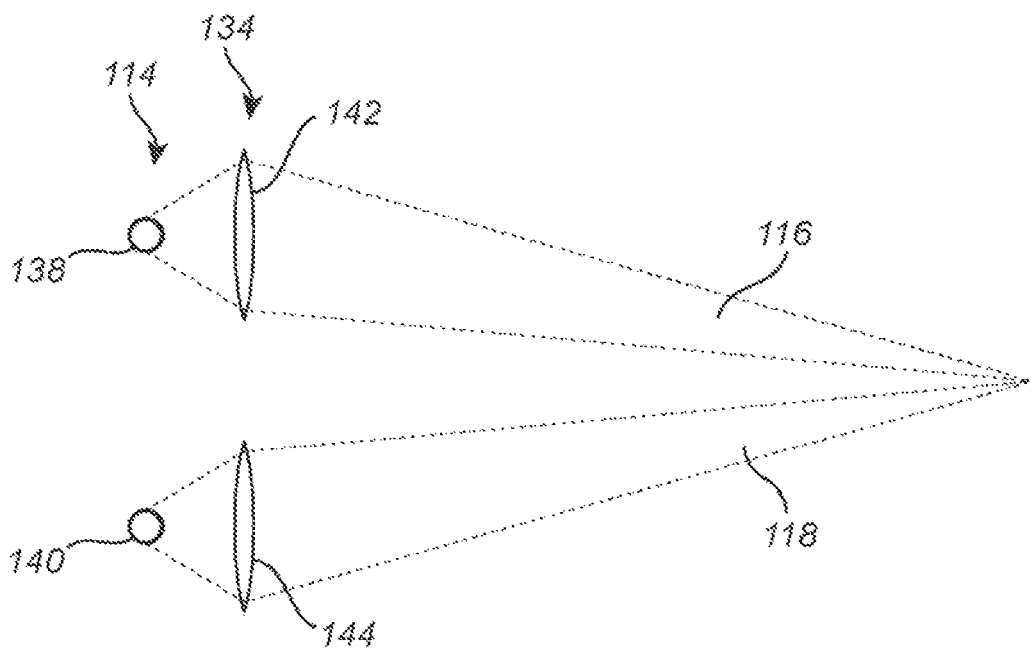
FIG. 3 is a schematic view of a first variant of a light source arrangement and associated focusing arrangement.

Now referring to FIG. 3, here is conceptually depicted a first variant of a light source arrangement 114 and an associated focusing arrangement 134 which may be used in the apparatus 100 of FIGS. 1 and 2.

The depicted light source arrangement 114 of FIG. 3 in includes a first light source 138 and a second light source 140. The first light source 138 is adapted to emit the first set of light beams 116 and a second light source 140 is adapted to emit the second set of light beams 118.

The first light source 138 and the second light source 140 may be of the same type. The first light source 138 and the second light source 140 may be of different types. The first light source 138 and the second light source 140 may be broadband spectral sources such as halogen light sources. Suitable halogen light sources for the first light source 138 and the second light source 140 may have a spectral distribution starting at about 400 nm and significantly decaying at about 2.5 µm. A maximum emission power may occur at about 1.3 µm. As an alternative, Xenon arc light sources may be used for the first light source 138 and the second light source 140. A shorter wavelength such as from 200 nm and above may be achieved by using Xenon arc light sources. As further alternatives, LED light sources or heating elements may be used for the first light source 138 and the second light source 140. For UV-Fluorescence spectroscopy LED light sources may be used to advantage. For mid infrared spectroscopy heating elements may be used to advantage. For high spatial and spectral resolution spectroscopy systems, Supercontinuum lasers may be used for the first light source 138 and the second light source 140. For high spatial and spectral resolution multispectral systems, lasers at multiple wavelength may be used in combination for the first light source 138 and the second light source 140. For highly spatial resolution optimized multispectral systems, LED's and Pulsed LED's may be used for the first light source 138 and the second light source 140 preferably in conjunction with line scan cameras.

Further, the depicted focusing arrangement 134 of FIG. 3 includes a first focusing element 142, in form of a lens, adapted to direct and focus the first set of light beams 116 on the scanning element 136 and a second focusing element 144, in form of a lens, adapted to direct and focus the second set of light beams 118 on the scanning element 136. Scanning element 136 is not depicted in FIG. 3 for reasons of simplicity. The first focusing element 142 and/or the second focusing element 144 may alternatively include a mirror. The first focusing element 142 and/or the second focusing element 144 may alternatively be a combination of at least one lens and at least one mirror.

Figure 4:
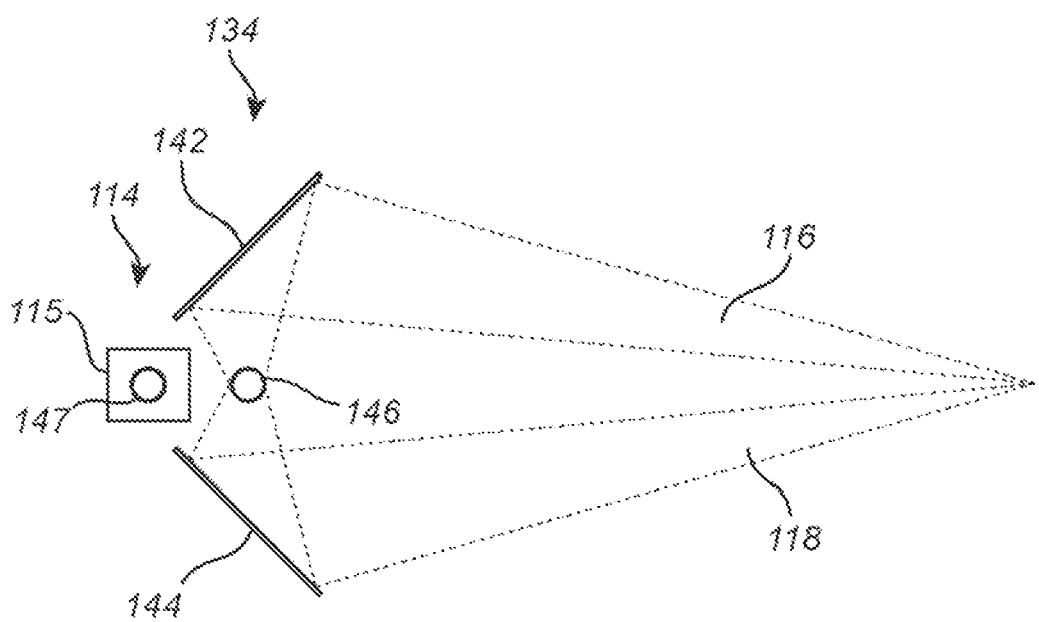
FIG. 4 is a schematic view of a second variant of a light source arrangement and associated focusing arrangement.

Now referring to FIG. 4, here is conceptually depicted a second variant of a light source arrangement 114 and an associated focusing arrangement 134 which may be used in the apparatus 100 of FIGS. 1 and 2.

The depicted light source arrangement 114 of FIG. 4 includes a single source 146. The single source 146 is adapted to emit the first set of light beams 116 and the second set of light beams 118. In practice, the first set of light beams 116 and the second set of light beams 118 are typically light beams emitted in different directions by the single source 146.

The single source 146 may be of any kind of the light sources described above in conjunction with FIG. 3.

Further, the depicted focusing arrangement 134 of FIG. 4 in includes a first focusing element 142, in form of an off axis parabolic mirror, adapted to direct and focus the first set of light beams 116 on the scanning element 136 and a second focusing element 144, in form of an off axis parabolic mirror, adapted to direct and focus the second set of light beams 118 on the scanning element 136. Scanning element 136 is not depicted in FIG. 4 for reasons of simplicity. The first focusing element 142 and/or the second focusing element 144 may alternatively include a flat mirror combined with an associated lens.

The depicted light source arrangement 114 of FIG. 4 including the single source 146, may include an automated or semiautomated light source switching device 115. The light source switching device 115 may hence be configured to physically move a spare light source 147 and the single light source 146 in case the single light source 146 fails. More specifically, in case the single light source fails 146, the light source switching device 115 may move the spare light source 147 into the position of the single light source 146 while removing the single light source 146. The light source switching device 115 may be configured to detect when the spare light source 147 has reached the correct position, i.e. the initial position of the single light source 146, and then switch on the spare light source 147. The light source switching device 115 may be automated and switch light source upon a detected failure of the single light source 146. As an alternative, the light source switching device 115 may be automated and switch light source in response to a user-initiated input.

Figure 5:
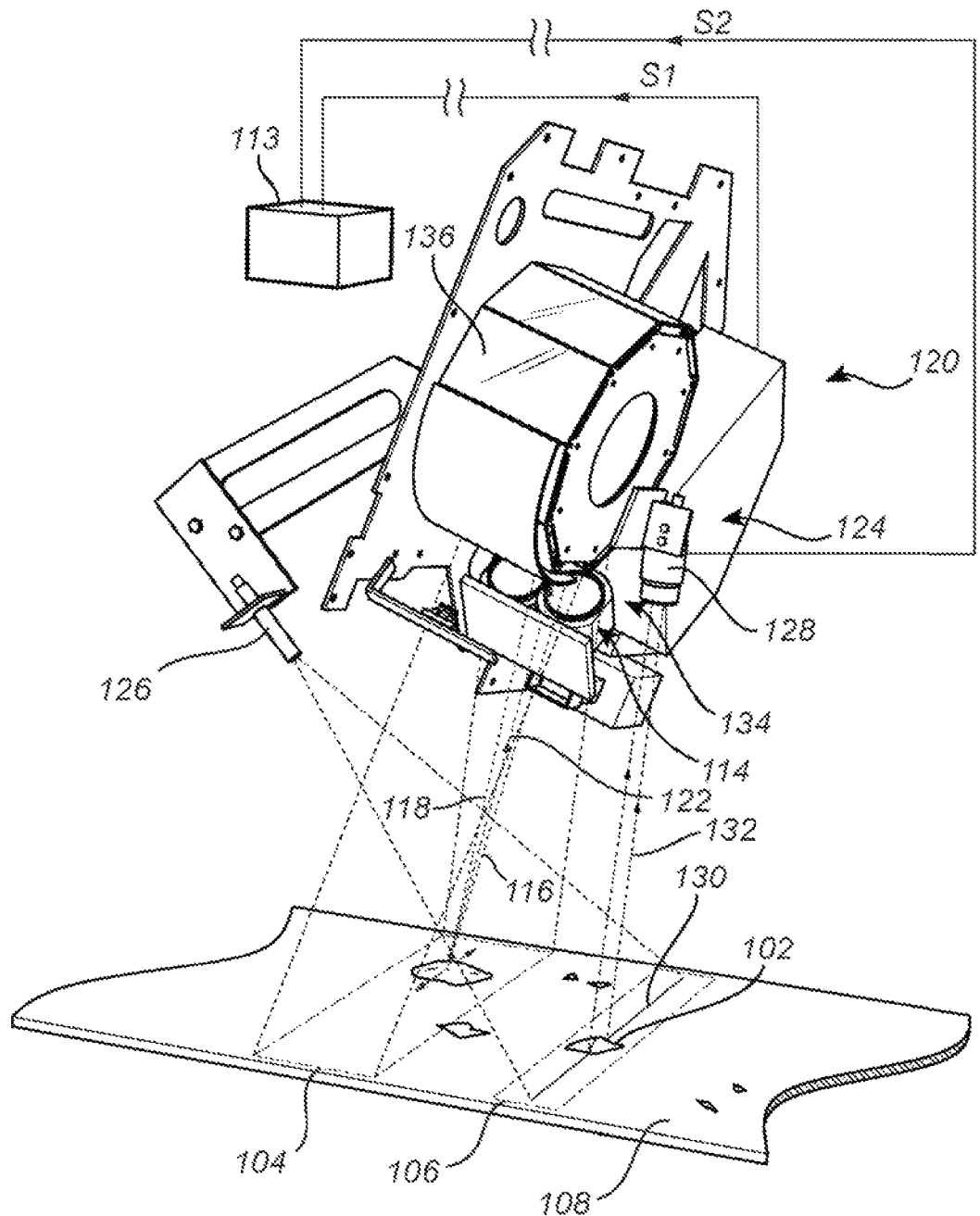
FIG. 5 is a schematic perspective detail view of a different setup that may be used in the apparatus of FIG. 1.

Now referring to FIG. 5, here is conceptually depicted a different setup of the components in the interior of the housing 110 of FIG. 1. FIG. 5 also illustrates a portion of the conveyor 108 including the first detection zone 104 and the second detection zone 106. The setup depicted in FIG. 5 is similar to that in FIG. 2. Hence, only relevant differences between FIG. 5 and FIG. 2. will be discussed to avoid undue repetition.

As can be seen in FIG. 5, the received light 122 of the spectroscopy system 120 intersects the line of laser light 130. Also, as can be seen in FIG. 5, the camera-based sensor arrangement 128 is viewing the second detection zone 106 on the conveyor 108 from above, i.e. in a normal direction with respect to the surface of the conveyor 108 and the laser arrangement 126 is inclined with respect to the surface of the conveyor 108, i.e. not normal to the surface of the conveyor 108. Hence, the line of laser light 130 impinges on the conveyor 108 in an angled fashion.

As discussed above in conjunction with FIG. 2, the position of matter 102 in the second detection zone 106 may be compensated for by taking the height or a varying height of the matter 102 into account when determining the position of the matter in the second detection zone 106. In other words, the processing unit 113 may compensate for the viewing angle of the camera-based sensor arrangement 128 with respect to the second detection zone 106 and hence with respect to the conveyor 108. In practice, the geometry of the laser arrangement 126 and the camera-based sensor arrangement 128 may be taken into account when determining the position of the matter in the second detection zone 106.

Figure 6:
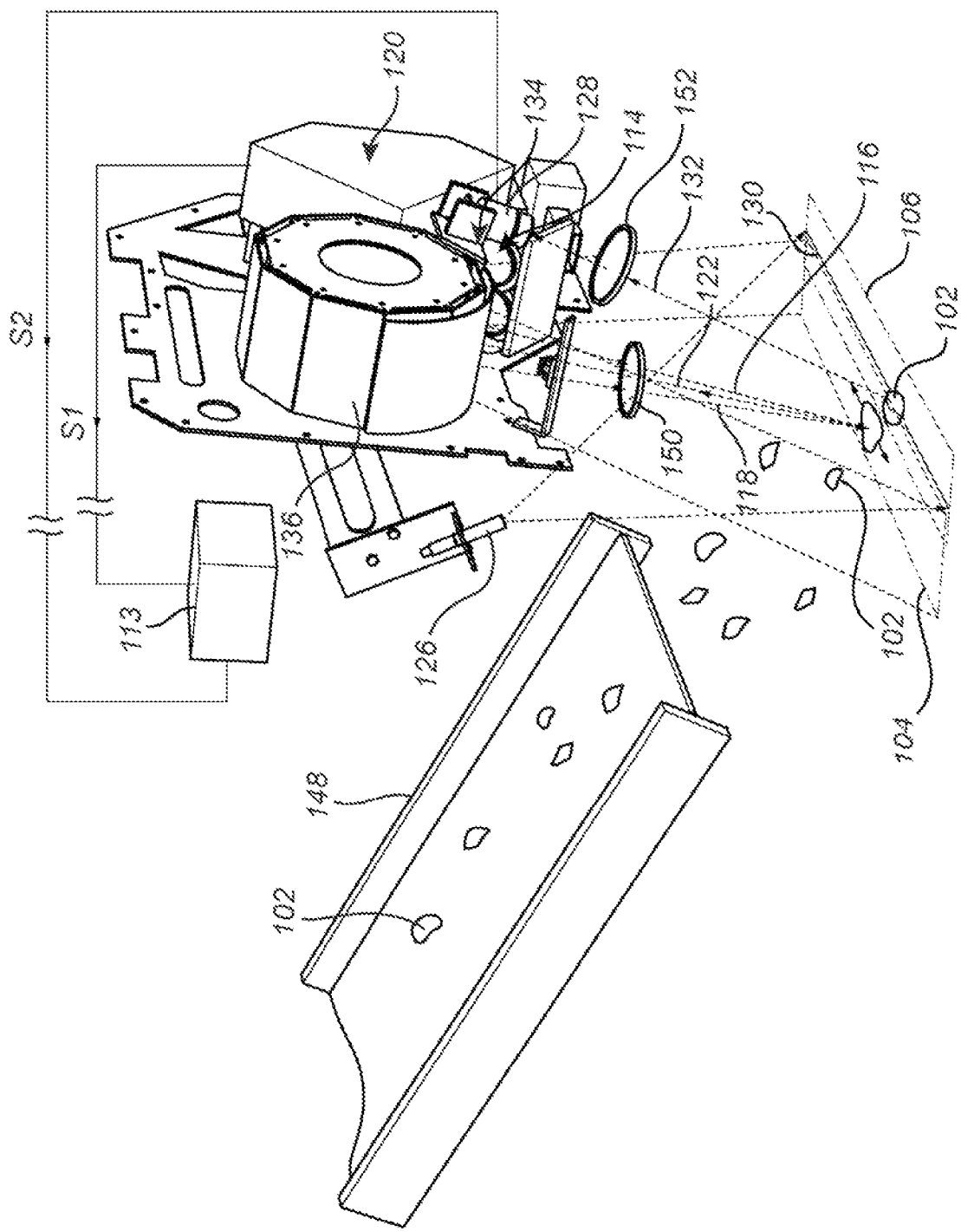
FIG. 6 is a schematic perspective detail view of a different setup where first and second detection zones overlap.

Now referring to FIG. 6, here is conceptually depicted a different setup of an apparatus largely corresponding to the apparatus 100 of FIG. 1. More specifically it is in FIG. 6. conceptually depicted a different setup of the components in the interior of the housing 110 of FIG. 1. FIG. 6 also illustrates how the conveyor 108 has been replaced by a chute 148. The setup depicted in FIG. 6 is to a large extent similar to that in FIG. 2. Hence, only relevant differences between FIG. 6 and FIG. 2. will be discussed to avoid undue repetition.

The depicted chute 148 is inclined such that the matter 102 is made to freefall of the chute 148 and through the first detection zone 104 and the second detection zone 106. The matter may alternatively be slid on the chute 148 through the first detection zone 104 and the second detection zone 106. The chute 148 may as an option include a vibration feeder for feeding the matter 102 onto the chute 148.

As can be seen in FIG. 6, the first detection zone 104 and the second detection zone 106 overlap. Hence, matter 102 provided through the first detection zone 104 and the second detection zone 106 will be present in the first detection zone 104 and the second detection zone 106 simultaneously. By the overlap of the first detection zone 104 and the second detection zone 106 it may be ascertained that measurements made by the spectroscopy system 120 and the laser triangulation system 124 may be correlated to the same piece of matter 102 in the respective detection zones. In other words, wrongful correlation of a particular piece of matter 102 may be counteracted.

When the first detection zone 104 and the second detection zone 106 overlap completely or partially, there is an outspoken risk that light originating from the light source arrangement 114 will reach the camera-based sensor arrangement 128 and disturb the same. Similarly, there is an outspoken risk that ambient light may reach the camera-based sensor arrangement 128 and disturb the same.

In order to reduce disturbances that may occur particularly when the first detection zone 104 and the second detection zone 106 overlap completely or partially, the apparatus 100 may be employed with one or more optical filters 150, 152 as depicted in FIG. 6.

In FIG. 6, a first optical filter 150 is arranged between the light source arrangement 114 and the first detection zone 104. More specifically, the depicted first optical filter 150 of FIG. 6 is located between the scanning element 136 and the first detection zone 104, i.e. in a location where the first set of light beams 116 and the second set of light beams 118 are scanned by the scanning element 136. The first optical filter 150 may for this reason have an elongated shape, such as a rectangular shape, along a scan direction.

The first optical filter 150 may advantageously be arranged at lens or exit window at the light source arrangement 114 or focusing arrangement 134.

The first optical filter 150 has optical properties that make the filter 150 counteract light originating from the first set of light beams 116 and the second set of light beams 118 from reaching the camera-based sensor arrangement 128.

In practice, the first optical filter 150 may block certain wavelengths of light originating from the first set of light beams 116 and the second set of light beams 118 while allowing other wavelengths to pass. Hence, the first optical filter 150 may block light originating the first set of light beams 116 and the second set of light beams 118 that otherwise would be detected by the camera-based sensor arrangement 128. In practice, the first optical filter 150 may block any light or a major portion of light having a wavelength below 900 nm. Hence, the first optical filter 150 may allow wavelengths in the NIR and IR ranges to pass. The wavelengths in the NIR and IR ranges is relevant for spectroscopy system 120 while not disturbing the camera-based sensor arrangement 128 or only disturbing the camera-based sensor arrangement 128 to a limited extent.

In FIG. 6, a second optical filter 152 is arranged between the second detection zone 106 and the camera-based sensor arrangement 128. The second optical filter 152 has optical properties that counteract passing of light 122 originating from the first set of light beams 116 and the second set of light beams 118. Also, the second optical filter 152 has optical properties that counteract passing of ambient light. Hence, a major portion of ambient light will be blocked by the second optical filter 152. Moreover, the second optical filter 152 has optical properties that allows passage of light originating from the line of laser light 130. Hence, the second optical filter 152 is typically a bandpass filter having a passband corresponding to the wavelength of the line of laser light 130. Hence, the arrangement of the second optical filter 152 may counteract undesired light that otherwise would risk disturbing the camera-based sensor arrangement 128 form reaching the same. For instance, is a red laser having a wavelength of 622 nm is utilised for providing the line of laser light 130, the second optical filter 152 may advantageously have a narrow passband around 622 nm so as to efficiently filter away almost all light not originating from the line of laser light 130. Hence, the passband of the second optical filter 152 is advantageously tailored to correspond to the wavelength or wavelengths of the line of laser light 130. Relevant bandpass filters for the second optical filter 152 are known in the art per se.

The person skilled in the art realizes that the present inventive concept by no means is limited to the preferred variants described above. On the contrary, many modifications and variations are possible within the scope of the appended claims.

For instance, the apparatus 100 may include a plurality of optical setups each including a light source arrangement 114, a spectroscopy system 120 and a laser triangulation system 124 as described above.

The optical setups may by arranged side by side over the width or a portion of the width of the conveyor 108 or chute 148. This means in practice that the width of the conveyor 108 or chute 148 may be covered by a plurality of first detection zones 106 and a plurality of second detection zones 108 of the above described type.

The optical setups may by arranged one after another along the conveyor 108 or chute 148. This means in practice that an extension along the conveyor 108 or chute 148 may be covered by a plurality of first detection zones 106 and a plurality of second detection zones 108 of the above described type.

The optical setups may by arranged side by side and one after the other. This means in practice that an extension along and across the conveyor 108 or chute 148 may be covered by a plurality of first detection zones 106 and a plurality of second detection zones 108 of the above described type.

The plurality of first detection zones 106 and second detection zones 108 may for instance partially overlap each other in a direction perpendicular to a flow direction of matter 102 being provided through the first detection zones 106 and second detection zones 108.

The plurality of first detection zones 106 and second detection zones 108 may for instance partially overlap each other in a direction along a flow direction of matter 102 being provided through the first detection zones 106 and second detection zones 108.

The plurality of first detection zones 106 and second detection zones 108 may for instance be arranged one after another and at the same time partially overlap each other in a direction perpendicular to a flow direction of matter 102 being provided through the first detection zones 106 and second detection zones 108.

The plurality of first detection zones 106 and second detection zones 108 may not physically overlap each other but still cover different portions of the width of the conveyor 108 or chute 148.

The plurality of first detection zones 106 and second detection zones 108 may for instance be arranged side by side and also partially overlap each other in a direction perpendicular to and/or along a flow direction of matter 102 provided through the first detection zones 106 and second detection zones 108.

Preferably, the plurality of optical setups is arranged in such a way, that upper surfaces or top surfaces of matter with large or maximum height can be detected across the complete conveyor 108 or chute 148.

If the plurality of second detection zones 108 overlap, the laser triangulation systems 124 of each optical setup may be adapted such that the plurality of second detection zones 108 do not interfere or only interfere to a limited extent. This may for instance be achieved by adapting the colours of the line of laser light 130 of each optical setup such that each optical setup uses a different colour of the line of laser light 130. Moreover, the first optical filter 150 and the second optical filter of each optical setup may be adapted to suit the light source arrangement 114, the spectroscopy system 120 and the laser triangulation system 124 of each optical setup, thereby further reducing interference between the plurality of second detection zones 108.

If the plurality of first detection zones 106 overlap, the light source arrangements 114 of each optical setup may be adapted such that the plurality of first detection zones 106 do not interfere or only interfere to a limited extent. This may for instance be achieved by adapting the light source arrangements 114 of each optical setup. The light source arrangements 114 of each optical setup may for this reason be synchronized. This means in practice that the first set of light beams 116 and the second set of light beams 118 of each optical setup may be synchronized so as to counteract interference therebetween. In other words, the first set of light beams 116 and the second set of light beams 118 of each optical setup may not reach the overlapping portions of the plurality of first detection zones 106 simultaneously.

Additionally, variations to the disclosed variants can be understood and effected by the skilled person in practicing the claimed invention, from a study of the drawings, the disclosure, and the appended claims. In the claims, the word "comprising" does not exclude other elements, and the indefinite article "a" or "an" does not exclude a plurality. The mere fact that certain measures are recited in mutually different dependent claims does not indicate that a combination of these measured cannot be used to advantage.

Itemised List of Exemplifying Embodiments

IEE1. An apparatus for detecting matter, the apparatus comprising:
a light source arrangement adapted to emit a first set of light beams and a second set of light beams towards a first detection zone through which the matter is provided,
a spectroscopy system adapted to receive and analyse light which is reflected and/or scattered by matter in the first detection zone, wherein the received light of the spectroscopy system originating from the first and second sets of light beams, and
a laser triangulation system including,
a laser arrangement adapted to emit a line of laser light towards a second detection zone through which the matter is provided, and
a camera-based sensor arrangement configured to receive and analyse light which is reflected and/or scattered by matter in the second detection zone, wherein the received light of the camera-based sensor arrangement originating from the line of laser light, wherein the received light of the spectroscopy system completely or partially intersects the received light of the camera-based sensor arrangement and/or the line of laser light.

IEE2. The apparatus according to IEE1, wherein the apparatus further comprises a focusing arrangement, wherein the focusing arrangement is adapted to direct and focus the first set of light beams and the second set of light beams on a scanning element, wherein the scanning element being adapted to redirect the first and second sets of light beams towards the first detection zone, whereby the first and second set of light beams converge at the first detection zone.

IEE3. The apparatus according to IEE1 or IEE2, wherein the light source arrangement includes a first light source adapted to emit the first set of light beams and a second light source adapted to emit the second set of light beams.

IEE4. The apparatus according to IEE2 or IEE3, wherein the focusing arrangement includes a first focusing element adapted to direct and focus the first set of light beams on the scanning element and a second focusing element adapted to direct and focus the second set of light beams on the scanning element.

IEE5. The apparatus according to IEE1 or IEE2, wherein the light source arrangement includes a single light source adapted to emit the first set of light beams and the second set of light beams.

IEE6. The apparatus according to IEE5 when depending on IEE2, wherein the focusing arrangement includes a first focusing element adapted to direct and focus the first set of light beams on the scanning element and a second focusing element adapted to direct and focus the second set of light beams on the scanning element.

IEE7. The apparatus according to any one of the preceding IEEs, wherein the spectroscopy system includes a first spectrometer system adapted to analyse light of a first wavelength interval and a second spectrometer system adapted to analyse light of a second wavelength interval.

IEE8. The apparatus according to any one of the preceding IEEs, wherein the spectroscopy system is a scanning spectroscopy system.

IEE9. The apparatus according to any one of the preceding IEEs, wherein the first detection zone and the second detection zone overlap.

IEE10. The apparatus according to any one of the preceding IEEs, wherein the apparatus further includes a first optical filter arranged between the light source arrangement and the first detection zone, the first optical filter counteracting light originating from the first set of light beams and the second set of light beams from reaching the camera-based sensor arrangement.

IEE11. The apparatus according to any one of the preceding IEEs, wherein the apparatus further includes a second optical filter arranged between the second detection zone and the camera-based sensor arrangement, the second optical filter counteracts passing of light originating from the first set of light beams, the second set of light beams and ambient light while allowing passage of light originating from the line of laser light.

IEE12. The apparatus according to any one of the preceding IEEs, the apparatus further comprising a processing unit coupled to the spectroscopy system and the camera-based sensor arrangement, wherein the processing unit being configured to determine a first property set pertaining to matter in the first detection zone based on an outputted signal of the spectroscopy system, and wherein the processing unit being configured to determine a second property set pertaining to matter in the second detection zone based on an outputted signal of the camera-based sensor arrangement.

IEE13. The apparatus according to IEE12, wherein the first property set is indicative of at least one of a spectral response of the matter, a material type of the matter, a colour of the matter, a fluorescence of the matter, a ripeness of the matter, a dry matter content of matter, a water content of the matter, a fat content of the matter, an oil content of the matter, a calorific value of the matter, a presence of bones or fishbones of the matter, a presence of pest of the matter, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a quality grade of the matter, a physical structure of the surface of the matter and molecular structure of the matter.

IEE14. The apparatus according to IEE12 or IEE13, wherein the second property set is indicative of at least one of a height of the matter, a height profile of the matter, a 3D map of the matter, an intensity profile of reflected and/or scattered light, a volume centre of the matter, an estimated mass centre of the matter, an estimated weight of the matter, an estimated material of the matter, a presence of matter, a non-presence of matter, a detection of isotropic and anisotropic light scattering of the matter, a structure and quality of wood, a surface roughness and texture of the matter and an indication of presence of fluids in the matter.

IEE15. The apparatus according to any one of IEE12-IEE14, wherein the processing unit being further configured to receive an input indicative of a viewing angle of the camera-based sensor arrangement with respect to the second detection zone, and to compensate for the viewing angle of the camera-based sensor arrangement when determining the second property set.

IEE16. The apparatus according to any one of IEE12-IEE15, the apparatus further comprising an ejection arrangement coupled to the processing unit, wherein the ejection arrangement is adapted to eject and sort matter into a plurality of fractions in response to receiving a signal form the processing unit based on the determined first property set and/or the determined second property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

IEE17. The apparatus according to any one of the preceding IEEs, the apparatus further comprising, a conveyor for conveying matter through the first detection zone and the second detection zone, or a chute, optionally including a vibration feeder, for sliding or freefalling of the matter through the first detection zone and/or the second detection zone.

The invention claimed is:

1. An apparatus for detecting matter, the apparatus comprising:
   a light source arrangement adapted to emit a first set of light beams and a second set of light beams towards a first detection zone through which the matter is provided,
   a spectroscopy system including a spectrometer having a first field of view and a first viewing angle related thereto, wherein the spectroscopy system is adapted to receive and analyse light which is reflected and/or scattered by matter in the first detection zone within said first field of view, wherein the received light of the spectroscopy system originates from the first and second sets of light beams, and
   a laser triangulation system including,
      a laser arrangement adapted to emit a line of laser light towards a second detection zone through which the matter is provided, and
      a camera-based sensor arrangement having a second field of view and a second viewing angle related thereto configured to receive and analyse light which is reflected and/or scattered by matter in the second detection zone within said second field of view, wherein the received light of the camera-based sensor arrangement originates from the line of laser light,
   wherein the first field of view and the first viewing angle related thereto as well as the second field of view and the second viewing angle related thereto are selected such that the first detection zone is spatially separated from the second detection zone and arranged upstream thereof so that the matter is provided through the first detection zone and the first field of view first and only subsequently through the second detection zone and the second field of view,
   at least one of a conveyor belt, a chute, and a free fall path configured to cause the matter to move along a flow direction from the first detection zone to the second detection zone,
   wherein at least one of the second viewing angle of the camera-based system and the first viewing angle of the spectroscopy system is non-normal and inclined relative to the flow direction so that
   the received light of the spectroscopy system completely intersects the received light of the camera-based sensor arrangement and/or the line of laser light.

2. The apparatus according to claim 1, wherein the apparatus further comprises a focusing arrangement,
   wherein the focusing arrangement is adapted to direct and focus the first set of light beams and the second set of light beams on a scanning element,
   wherein the scanning element is adapted to redirect the first and second sets of light beams towards the first detection zone, whereby the first and second set of light beams converge at the first detection zone.

3. The apparatus according to claim 1, wherein the light source arrangement includes a first light source adapted to emit the first set of light beams and a second light source adapted to emit the second set of light beams.

4. The apparatus according to claim 2, wherein the focusing arrangement includes a first focusing element adapted to direct and focus the first set of light beams on the scanning element and a second focusing element adapted to direct and focus the second set of light beams on the scanning element.

5. The apparatus according to claim 2, wherein the light source arrangement includes a single light source adapted to emit the first set of light beams and the second set of light beams.

6. The apparatus according to claim 5, wherein the apparatus further comprises a focusing arrangement,
   wherein the focusing arrangement is adapted to direct and focus the first set of light beams and the second set of light beams on a scanning element,
   wherein the scanning element is adapted to redirect the first and second sets of light beams towards the first detection zone, whereby the first and second set of light beams converge at the first detection zone,
   wherein the focusing arrangement includes a first focusing element adapted to direct and focus the first set of light beams on the scanning element and a second focusing element adapted to direct and focus the second set of light beams on the scanning element.

7. The apparatus according to claim 1, wherein the spectroscopy system includes a first spectrometer system adapted to analyse light of a first wavelength interval and a second spectrometer system adapted to analyse light of a second wavelength interval.

8. The apparatus according to claim 1, wherein the spectroscopy system is a scanning spectroscopy system.

9. The apparatus according to claim 1, wherein the first detection zone and the second detection zone overlap.

10. The apparatus according to claim 1, wherein the apparatus further includes a first optical filter arranged between the light source arrangement and the first detection zone, the first optical filter counteracting light originating from the first set of light beams and the second set of light beams from reaching the camera-based sensor arrangement.

11. The apparatus according to claim 1, wherein the apparatus further includes a second optical filter arranged between the second detection zone and the camera-based sensor arrangement, the second optical filter counteracts passing of light originating from the first set of light beams, the second set of light beams and ambient light while allowing passage of light originating from the line of laser light.

12. The apparatus according to claim 1, the apparatus further comprising a processing unit coupled to the spectroscopy system and the camera-based sensor arrangement,
   wherein the processing unit is configured to determine a first property set pertaining to matter in the first detection zone based on an outputted signal (S1) of the spectroscopy system, and
   wherein the processing unit is configured to determine a second property set pertaining to matter in the second detection zone based on an outputted signal (S2) of the camera-based sensor arrangement.

13. The apparatus according to claim 12, wherein the first property set is indicative of at least one of a spectral response of the matter, a material type of the matter, a colour of the matter, a fluorescence of the matter, a ripeness of the matter, a dry matter content of matter, a water content of the matter, a fat content of the matter, an oil content of the matter, a calorific value of the matter, a presence of bones or fishbones of the matter, a presence of pest of the matter, a mineral type of the matter, an ore type of the matter, a defect level of the matter, a detection of hazardous biological materials of the matter, a presence of matter, a non-presence of matter, a detection of multilayer materials of the matter, a detection of fluorescent markers of the matter, a quality grade of the matter, a physical structure of the surface of the matter and molecular structure of the matter.

14. The apparatus according to claim 12, wherein the second property set is indicative of at least one of a height of the matter, a height profile of the matter, a 3D map of the matter, an intensity profile of reflected and/or scattered light, a volume centre of the matter, an estimated mass centre of the matter, an estimated weight of the matter, an estimated material of the matter, a presence of matter, a non-presence of matter, a detection of isotropic and anisotropic light scattering of the matter, a structure and quality of wood, a surface roughness and texture of the matter and an indication of presence of fluids in the matter.

15. The apparatus according to claim 12, wherein the processing unit is further configured to receive an input indicative of a viewing angle of the camera-based sensor arrangement with respect to the second detection zone, and
to compensate for the viewing angle of the camera-based sensor arrangement when determining the second property set.

16. The apparatus according to claim 12, the apparatus further comprising an ejection arrangement coupled to the processing unit,
wherein the ejection arrangement is adapted to eject and sort matter into a plurality of fractions in response to receiving a signal form the processing unit based on the determined first property set and/or the determined second property set, the ejection arrangement being adapted to eject and sort said matter by means of at least one of a jet of compressed air, a jet of pressurized water, a mechanical finger, a bar of jets of compressed air, a bar of jets of pressurized water, a bar of mechanical fingers, a robotic arm and a mechanical diverter.

17. The apparatus for detecting matter according to claim 1, wherein the camera-based sensor arrangement is provided upstream of the spectrometer relative to the flow direction.

18. The apparatus for detecting matter according to claim 1, wherein the camera-based sensor arrangement and the spectrometer views the same side of the at least one of a conveyor belt, a chute and a free fall path.

19. An apparatus for detecting matter, the apparatus comprising:
a light source arrangement adapted to emit a first set of light beams and a second set of light beams towards a first detection zone through which the matter is provided,
a spectroscopy system including a spectrometer having a first field of view and a first viewing angle related thereto, wherein the spectroscopy system is adapted to receive and analyse light which is reflected and/or scattered by matter in the first detection zone within said first field of view, wherein the received light of the spectroscopy system originates from the first and second sets of light beams, and
a laser triangulation system including,
a laser arrangement adapted to emit a line of laser light towards a second detection zone through which the matter is provided, and
a camera-based sensor arrangement having a second field of view and a second viewing angle related thereto configured to receive and analyse light which is reflected and/or scattered by matter in the second detection zone within said second field of view, wherein the received light of the camera-based sensor arrangement originates from the line of laser light,
wherein the first field of view and the first viewing angle related thereto as well as the second field of view and the second viewing angle related thereto are selected such that the first detection zone is spatially separated from the second detection zone and arranged downstream thereof so that the matter is provided through the second detection zone and the second field of view first and only subsequently through the first detection zone and the first field of view,
at least one of a conveyor belt, a chute, and a free fall path configured to cause the matter to move along a flow direction from the second detection zone to the first detection zone,
wherein at least one of the second viewing angle of the camera-based system and the first viewing angle of the spectroscopy system is non-normal and inclined relative to the flow direction so that the received light of the spectroscopy system completely intersects the received light of the camera-based sensor arrangement.

20. The apparatus for detecting matter according to claim 19, wherein the camera-based sensor system is provided upstream of the spectrometer relative to the flow direction.

21. The apparatus for detecting matter according to claim 19, wherein the camera-based sensor arrangement and the spectrometer views the same side of the at least one of a conveyor belt, a chute and a free fall path.

* * * * *